Nov. 29, 1927.                                          1,651,226
L. J. PEARSON
BATTERY SEALING CONSTRUCTION
Filed April 25, 1922          2 Sheets-Sheet 1

Inventor.-
Lawrence J. Pearson.
by his Attorneys.—
Houson & Houson

Nov. 29, 1927. 1,651,226
L. J. PEARSON
BATTERY SEALING CONSTRUCTION
Filed April 25, 1922   2 Sheets-Sheet 2
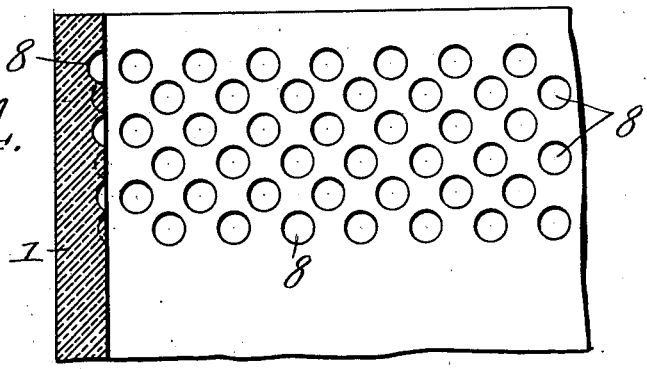
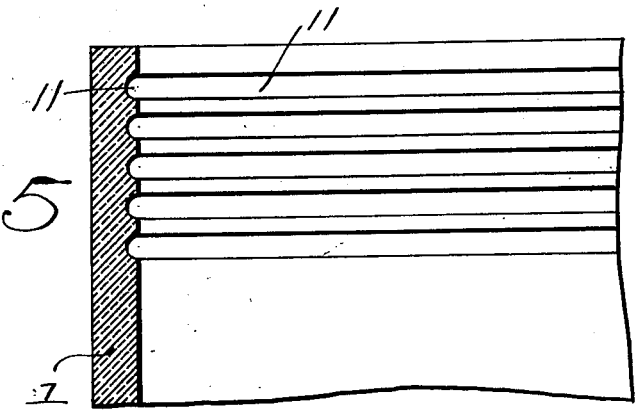
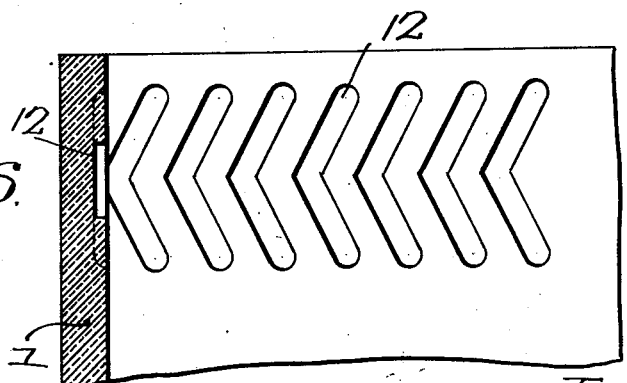
Inventor-
Lawrence J. Pearson.
by his Attorneys.
Howson & Howson Patented Nov. 29, 1927.

1,651,226

UNITED STATES PATENT OFFICE.

LAWRENCE J. PEARSON, OF WYNCOTE, PENNSYLVANIA, ASSIGNOR TO PHILADELPHIA STORAGE BATTERY COMPANY, OF PHILADELPHIA, PENNSYLVANIA, A CORPORATION OF PENNSYLVANIA.

BATTERY-SEALING CONSTRUCTION.

Application filed April 25, 1922. Serial No. 556,397.

One object of this invention is to provide an improved seal between the walls of a battery jar or other container and the cover or closure therefor, with novel means for insuring the retention between these members and the adherence thereto of a body of sealing compound. More particularly the invention contemplates a simple method of forming hard rubber or equivalent surfaces with any desired design of depressions or projections adapted to give asphaltum or similar sealing compound a good hold or grip on said surfaces.

These objects and other advantageous ends I attain as hereinafter set forth, reference being had to the accompanying drawings, in which, Fig. 1 is a vertical section taken through one cell of a storage battery, showing my invention as applied thereto;

Fig. 4 is an enlarged fragmentary elevation partly in section, of a container wall constructed in accordance with that form of the invention shown in Fig. 1; and Figs. 5 and 6 are respectively elevations partly in section showing further modifications of my invention as applied to the container walls.

Figure 1:
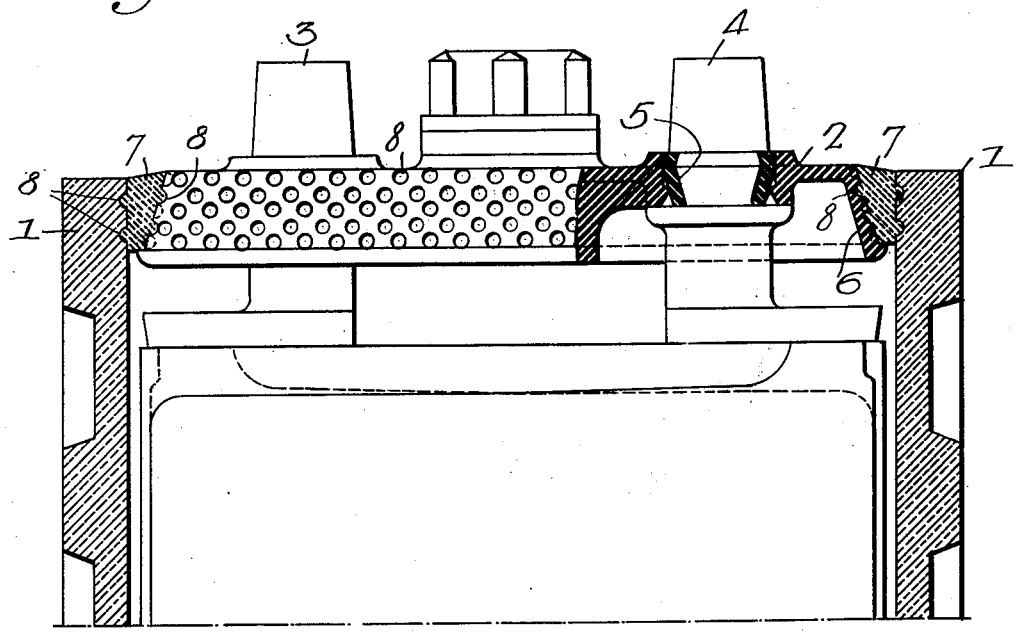

In the above drawings 1—1 represent the walls of a container or jar adapted for use as part of a storage battery and this is shown as provided with a cover or closure 2 of insulating material such as hard rubber fitting within its otherwise open top. A pair of terminal posts 3 and 4 are extended through this cover and within the container 1 are connected to or form part of the plate-and-separator element of the cell.

Suitable sealing means such as the soft rubber packing ring 5 is provided between each of the terminal posts and the cover, as described and claimed in Patent #1,371,894 dated March 15, 1921. Said cover preferably consists of a molded body of hard rubber having a downwardly and outwardly inclined peripheral flange 6, between which and the adjacent walls of the container 1 is placed a body of asphaltum or other suitable sealing compound 7.

In order to improve the adherence and increase or strengthen the hold between the compound and the adjacent surfaces of the cover flange 6 and the container walls 1, I may form these structures with a series of indentations or cavities 8 which, as shown in Figs. 1 and 4, may be of spherically-curved shape. The sealing compound 7, being applied in a molten or plastic condition, extends into these depressions so that it is positively held in place between the cover flange and the container walls.

Figure 2:
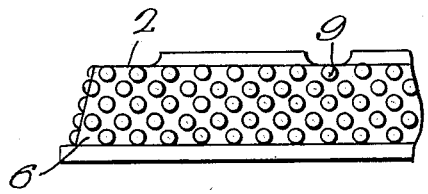
Fig. 2 is an elevation of a portion of a cell cover illustrating a modified form of my invention in which projections are employed in place of the depressions shown in Fig. 1.
Figure 3:
Fig. 3 is an elevation of part of a cell cover showing another modification of the invention in which continuous grooves or recesses are provided in the surface to which sealing compound is applied.

Without departing from my invention, I may form either or both of the adjacent surfaces of the container and cover with spherically-curved or other suitably formed projections 9, as indicated in Fig. 2, in which case the areas between the projections constitute depressions within the scope of the appended claims, or I may substitute for the relatively small isolated recesses or projections continuous grooves 10, 11, as shown in Figs. 3 and 5 respectively.

It is obvious that this deformation of the compound-receiving surfaces may be given innumerable other forms without departing from my invention, such for example as is shown in Fig. 6 where either or both opposed surfaces to be joined are provided with a series of angular depressions 12 which, like the depressions or projections of the other forms of my invention, are designed to receive and interlock with a sealing compound so as to give this a good grip on the container or cover walls.

In any case the connection or bond between the sealing compound and the parts associated therewith is greatly improved, owing to the increase in area of the adhering surfaces and the uneven configuration thereof.

As a practical means of forming the container or cover surfaces with the depressions or projections and at the same time keeping said surfaces free of the soap or other coating usually used on the molds, I have devised the method of forming strips of sheet tin or other suitable metal with the desired design of depressions or projections by means of suitable dies and placing said strip between the raw rubber or other stock and the mold during the vulcanization or molding of the part. The strip is removed from the core or mold adhering to the molded part and may then be stripped off leaving a clean surface bearing its imprint. In some cases however, it may be possible and desirable to form the parts with uneven surfaces by the use of molds which of themselves carry the desired design of depressions or projections.

I claim:

1. A battery cell container of rubber material having a portion of its surface tin-finished and recessed for reception of a sealing compound.

2. The combination in a battery, of a container of rubber material having a portion of its area tin-finished, a cover for the container, and a sealing compound in adherent contact with the said tin-finished area.

3. The combination in a battery of a container having an open top and having the wall surface adjacent said top formed with depressions; a cover for said container; and sealing compound between the adjacent portions of the container and the cover extending into said depressions and constituting sole means for maintaining the cover in place.

4. The combination in a battery, of a container of rubber material having a portion of its area tin-finished and recessed for the reception of a sealing compound, and a cover for the container and sealing compound in adherent contact with the said tin-finished and recessed area of the container and closing the space between the container and the cover.

5. A battery container having flat vertical inner surfaces, and a horizontal ribbon of angular lines impressed into said surfaces adjacent to the top thereof.

6. An article of manufacture, consisting of a container having flat inner vertical surfaces, and having impressed into said surfaces adjacent to their upper ends a ribbon of diagonal lines.

LAWRENCE J. PEARSON.